Jan. 29, 1952     R. A. BRODING     2,583,724
MAGNETIC FLOWMETER
Filed May 8, 1948     2 SHEETS—SHEET 1
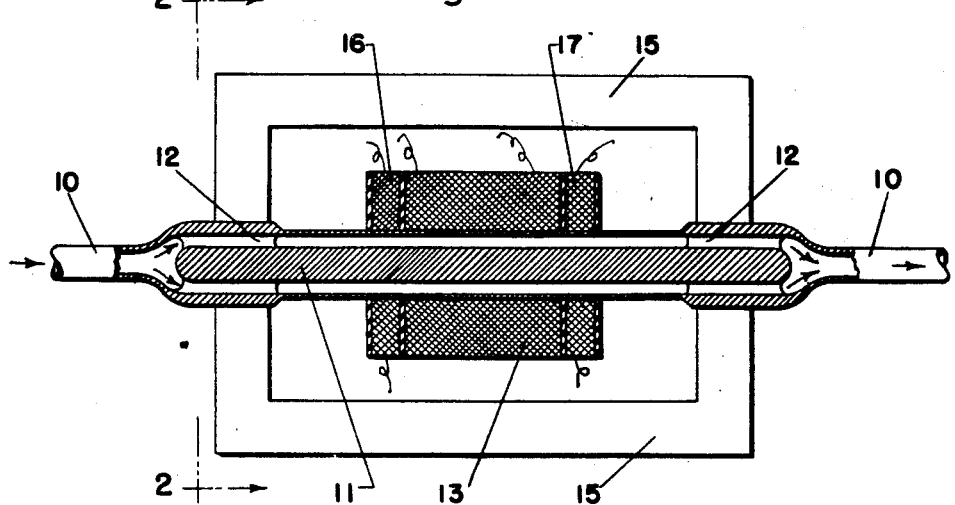
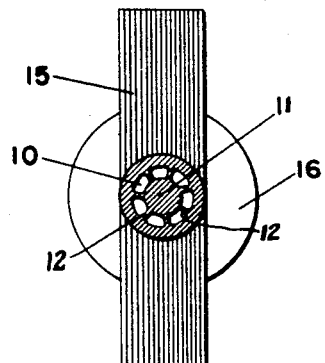
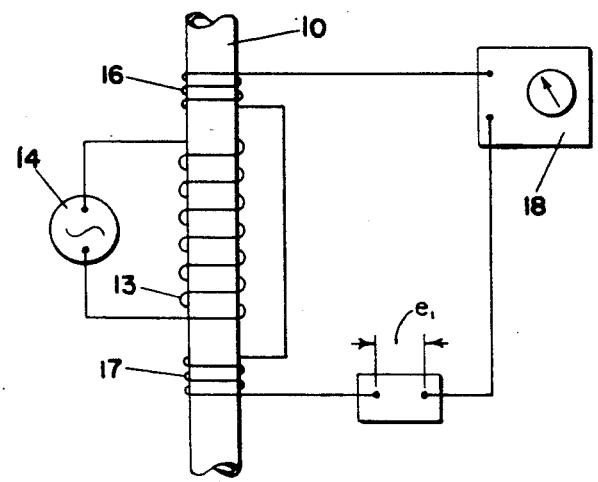
*INVENTOR.*
ROBERT A. BRODING
BY
ATTORNEY

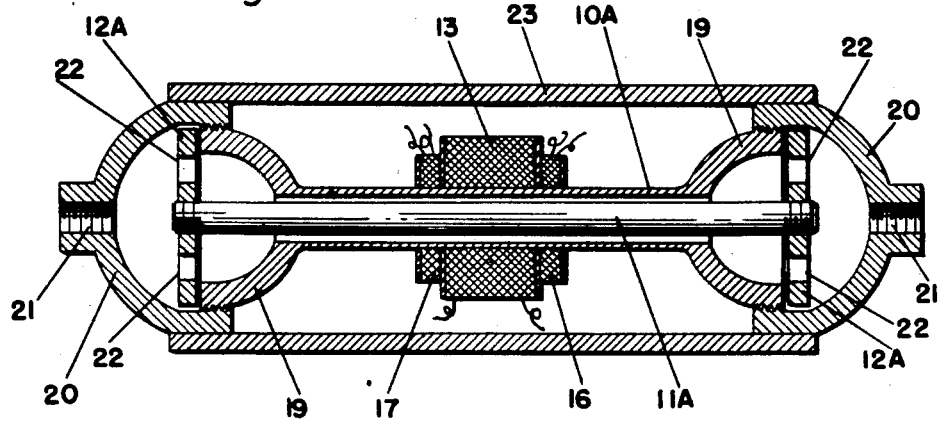
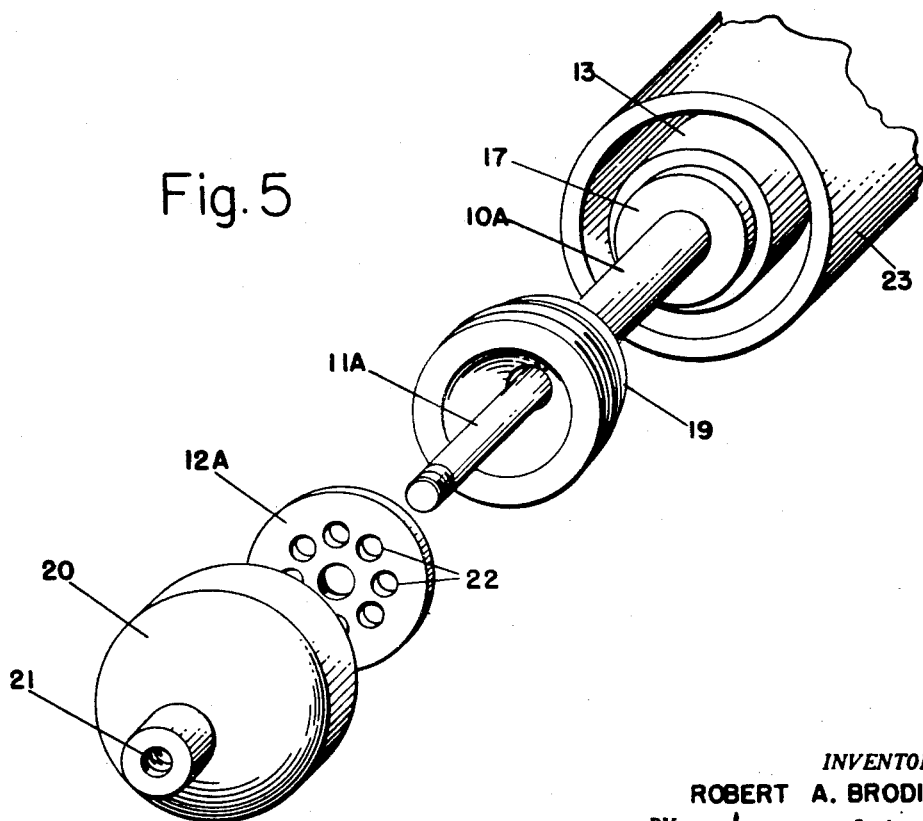

Patented Jan. 29, 1952

2,583,724

UNITED STATES PATENT OFFICE 2,583,724

MAGNETIC FLOWMETER

Robert A. Broding, Dallas, Tex., assignor, by mesne assignments, to Socony-Vacuum Oil Company, Incorporated, New York, N. Y., a corporation of New York Application May 8, 1948, Serial No. 25,959

11 Claims. (Cl. 73—194)

This invention relates to methods of and apparatus for determining the rate of flow of liquids and particularly to arrangements for producing a voltage varying in accordance with change in velocity of a liquid.

In accordance with the invention, the liquid is directed for flow coaxially of a coil system including a winding energized by alternating current and one or more pick-up coils in which is induced an alternating voltage whose amplitude varies as a function of the rate of flow of the liquid. Preferably, two pick-up coils are used, one at either end of the energizing coil and they are so connected that the steady components of their respective output voltages are in opposition whereas the variable components of those voltages are additive.

Further in accordance with the invention and more specifically, the energizing and pick-up coils are coaxially disposed along a pipe through which the liquid flows and within which there extends a magnetic core member. Preferably, the core member is part of a closed magnetic circuit including a magnetic shell or tube which surrounds or encloses the coils to increase the sensitivity of the device and to minimize the disturbing effect of extraneous fields.

The invention further resides in features of construction, combination and arrangement herein disclosed and claimed.

For a more detailed understanding of the invention and for illustration of embodiments thereof, reference is made to the accompanying drawings, in which:

Fig. 1 is an elevational view, partly in section, of a magnetic flow-meter device;

Fig. 2 is an end view, partly in section, taken along line 2—2 of Fig. 1;

Fig. 3 is a schematic wiring diagram of a flow-metering circuit;

Fig. 4 is a sectional view of a modified form of the flow-metering device; and

Fig. 5 is an exploded view showing parts appearing in Fig. 4.

Referring to Figs. 1 and 2, the pipe 10, through which flows the liquid whose velocity is to be determined, has extending within it a magnetic core member 11 supported centrally thereof by the centering members 12. In the central section of the pipe, there is an annular space or channel between the outside circumference of the core member 11 and the inner face of the tube 10; this space is in communication with the two end sections of the pipe 10 by passages provided between the core-spacing members 12.

The core member 11 is of soft iron or equivalent material having high permeability whereas the tube 10 is of low permeability and preferably of high electrical resistance. For example, tube 10 may be of insulating material such as Bakelite, or glass although it may be of metal such as stainless steel having the aforesaid electrical and magnetic properties.

The central portion of the pipe 10, and the core member 11 within it, extends through or coaxially of a winding 13 energized from a suitable source of alternating current 14, Fig. 3, to produce an alternating magnetic flux which flows in a magnetic circuit including the core member 11 and preferably in a closed magnetic circuit including core member 11 and the magnetic yoke or shell 15. The centering members 12, integral or attached to the core member 11, serve not only to maintain it in proper position with respect to the pipe 10 to provide an annular flow channel but also afford a path of low magnetic reluctance between each end of the core member 11 and the adjacent portion of the magnetic shell 15.

The central section of the pipe 10 also extends through two pick-up coils 16 and 17 disposed respectively adjacent the opposite ends of and symmetrically with respect to the energizing coil 13. For the direction of flow indicated in Fig. 1, coil 17 is upstream with respect to the field-producing winding 13 and coil 16 is downstream with respect thereto. As indicated in Fig. 3, the pick-up coils 16 and 17 are connected in series opposition so that the voltages induced in them for zero velocity of liquid through the pipe 10 are in opposition and are effective mutually to cancel one another. This same connection, however, results in addition of the components of the induced voltages which vary in accordance with the rate of flow of liquid passing successively through the several coils.

When the liquid is at rest, the distribution of magnetic flux is symmetrical with respect to the pick-up coils 16 and 17 and the voltages induced in them are equal in magnitude. This symmetry, however, is disturbed when the fluid is in motion due to eddy currents induced in the electrically conductive liquid and this dissymmetry varies as a substantially linear function of rate of flow of the liquid. Accordingly, the voltages induced in the pick-up coils 16 and 17 are differentially affected by change in rate of flow of the liquid. Otherwise expressed, for a given change of rate of flow, the voltage induced in one of the pick-up coils is increased and the voltage induced in the other coil concurrently decreased by a like amount. However, because of the aforesaid poling of the coils, the effects due to flow upon the voltage are cumulative so that the joint output of the coils varies as a direct function of the velocity of the liquid, other factors remaining constant. The voltage output of the device may be measured by any suitable conventional measuring device or circuit generically represented by indicator 18, Fig. 3. Preferably the alternating output voltage is impressed upon an alternating current amplifier such as disclosed in co-pending application, Serial No. 727,798, now abandoned, by Dayton H. Clewell, a co-worker of applicant, which includes thermionic tubes and has a suitable number of stages for actuation of a rugged measuring or control device.

Because of difficulties in manufacture and assembly it is not economical or feasible to attain complete balance between or cancellation of, the voltages induced in pick-up coils 16 and 17. Any voltage present in the circuit when the liquid is at rest may, however, readily be cancelled by a voltage of proper phase and amplitude introduced at terminals $e_1$.

For a given modification of such a flow-meter its electrical efficiency E may be defined as the ratio of the unbalance voltage per unit velocity flow to the voltage induced in pick-up coil 16 or 17 for zero fluid velocity. In the modification of Fig. 3, in which the magnetic core (core 11, Fig. 1) was omitted, the efficiency $E=0.18\times10^{-6}$/cc./sec. For the embodiment of Fig. 1, $E=1.0\times10^{-5}$/cc./sec. In the preferred modification, Fig. 4, $E=1.6\times10^{-5}$/cc./sec. Though performing the same method as that of Fig. 1 and incorporating the same general features of arrangement, the device of Fig. 4 is of construction which facilitates manufacture, assembly and replacement of parts. For brevity and clarity of explanation, those components which have the same functions as components previously described are identified by the same reference characters with the addition of the suffix A: structurally similar components of all figures are identified by the same reference characters.

As in the modification of Fig. 1, the tube 10A extends through and may support the energizing coil 13 and the pick-up windings 16 and 17. The core member 11A which extends through tube 10A is supported centrally thereof by the two discs 12A, respectively attached in any suitable manner, as by threading, to the opposite ends of the core member. The end discs 12A are clamped against the bell-shaped members 19 which are formed integrally with, or preferably detachably attached to, the opposite ends of the tube 10A. The tube 10A is of material, preferably stainless steel, of low magnetic permeability and low electrical conductivity. Preferably, the members 19 are of soft iron or its magnetic equivalent. Each of the extensions 19 is received by a metal cap or cup member 20, having therein an opening 21 to receive a pipe for flow of liquid into or out of the path provided by the openings 22 through the core-spacing members 12A and the annular passage between the core member 11A and the inner surface of the tube 10A.

The sensitivity of the device is substantially increased, for example sixty per cent or more, and the probability of disturbance by extraneous magnetic fields is minimized, by enclosing the assembly as thus far described within a cylinder 23 of iron or other material having high magnetic permeability. There is thus formed a closed magnetic path, approximately toroidal in shape, comprising cylindrical shell 23, members 19, end caps 20, spacing discs 12A, and core member 11A, all of soft iron or equivalent.

The measuring circuit for the flow-meter of Figs. 4 and 5 may be the same as shown in Fig. 3. If, due to dissymmetry, the residual output voltage of the coils 16 and 17 of either modification is not zero for zero velocity of the liquid, there may be included effectively in series opposition therewith, as mentioned above and as described and claimed in co-pending Clewell application, Serial No. 727,798, now abandoned, an equal alternating voltage derived from or having the same frequency as the source 14.

It should be noted that this method of determining rate of flow does not involve the use of any contacts in engagement with the liquid so there are avoided problems including corrosion of the contacts, contact potentials, and other inherent difficulties.

In either of the modifications above described, a single pick-up coil may be used but the sensitivity is materially decreased and the accuracy is impaired because, for example, of variations in the supply source 14 whose effects are substantially balanced out with the two-coil arrangement. The supply source may be one available for lighting or other purposes, such as a 60-cycle power line or, for field or laboratory use, may be a portable unit, such as a vibrator or an engine-generator set, suited to supply the desired voltage and frequency. In general, the frequency should be high compared to the expected rates of fluctuation in velocity of the liquid.

Though several modifications have been described and illustrated, it shall be understood the invention is not limited to the particular forms and arrangements specifically discussed but that changes and modifications may be made within the scope of the appended claims.

What is claimed is:

1. A flow-meter device comprising magnetic core structure, energizing and pick-up coils coaxially mounted with respect to said core structure, and a tubular member of low magnetic permeability and low electrical conductivity extending though said coils and about said core structure to provide a passage for flow of electrically conductive liquid externally of said core structure and coaxially through said coils in succession.

2. A flow-meter device comprising a conduit having low magnetic permeability and low electrical conductivity, magnetic core structure within and extending along said conduit, and energizing and pick-up coils arranged coaxially and end-to-end with said conduit and core structure extending through them whereby electrically conductive liquid flowing in said conduit is subjected to a magnetic field normal to its direction of flow.

3. A flow-meter device comprising core structure forming a closed magnetic circuit, a conduit having low magnetic permeability and low electrical conductivity and extending along part of said core structure, and energizing and pick-up coils arranged coaxially and end-to-end with said conduit and said part of said core structure extending through them.

4. A flow-meter device comprising core structure forming a closed magnetic circuit, an energizing coil through which said structure extends, a conduit having low magnetic permeability and low electrical conductivity and embracing and extending along part of said structure, and a pick-up coil through which said conduit and said part of said core structure extend.

5. A flow-meter device comprising an energizing coil, pick-up coils disposed respectively adjacent opposite ends of said energizing coil, a conduit having low magnetic permeability and low electrical conductivity and extending through said coils, and a magnetic core member extending through said coils and within said conduit, whereby electrically conductive liquid flowing in said conduit is subjected to a magnetic field normal to its direction of flow.

6. A flow-meter device comprising a pipe having low magnetic permeability and low electrical conductivity, a magnetic core member extending lengthwise within said pipe and at least in part spaced therefrom to permit passage of electrically conductive liquid, along a path within said pipe and about said core member and energizing and pick-up coils coaxially mounted with respect to said pipe and said core member.

7. A flow-meter device comprising a pipe having low magnetic permeability and low electrical conductivity, a magnetic core member extending lengthwise within said pipe and at least in part spaced therefrom to permit flow of liquid and for subjecting the liquid to a magnetic field normal to its direction of flow, an energizing coil through which said pipe and said core member extend, and pick-up coils respectively adjacent opposite ends of said energizing coil and through which said pipe and said core member extend.

8. A flow-meter device comprising a magnetic shell, a pipe extending through said shell, a magnetic core member extending lengthwise within said pipe to form part of a magnetic circuit including said shell and at least in part spaced from said pipe to permit flow of liquid, and energizing and pick-up coils within said shell and through which said pipe and core member extend.

9. A flow-meter comprising a tubular magnetic housing, a magnetic core member extending axially of said housing and forming therewith a toroidal magnetic circuit, pipe structure enclosing said core member and providing for flow of fluid through said housing, a coil within said housing energizable to excite said magnetic circuit, and pick-up coils within said housing and through which said core member and pipe structure extend.

10. A flow-meter comprising a pipe for flow of liquid, a toroidal magnetic circuit comprising a core member extending interiorly of said pipe and a tubular housing extending exteriorly of said pipe, and energizing and pick-up coils disposed within said housing, externally of said pipe and in coaxial relation with respect to each other, said pipe and said core member.

11. A flow-meter comprising a tubular casing a magnetic material, a pipe extending coaxially of said casing, a core member within said pipe, centering elements for said core member, end caps for said casing, said elements and caps being provided with passages permitting flow of liquid through said pipe and cooperating to permit magnetic flux from said casing to said core member, and energizing and pick-up coils within said casing and through which said pipe and core member extend.

ROBERT A. BRODING.

REFERENCES CITED

The following references are of record in the file of this patent:

UNITED STATES PATENTS

| Number | Name | Date |
|---|---|---|
| 2,149,847 | Kolin | Mar. 7, 1939 |
| 2,279,239 | Meyerhans | Apr. 7, 1942 |
| 2,435,043 | Lehde et al. | Jan. 27, 1948 |